US012767454B2

(12) United States Patent
Habermann et al.

(10) Patent No.: US 12,767,454 B2
(45) Date of Patent: Oct. 20, 2026

(54) DEVICE AND METHOD FOR HANDLING AND/OR GROUPING PIECE GOODS

(71) Applicant: KHS GMBH, Dortmund (DE)

(72) Inventors: Stefan Habermann, Weiler (DE); Alexander Mann, Eckelsheim (DE)

(73) Assignee: KHS GmbH, Dortmund (DE)

( * ) Notice: Subject to any disclaimer, the term of this patent is extended or adjusted under 35 U.S.C. 154(b) by 416 days.

(21) Appl. No.: 18/556,917

(22) PCT Filed: May 12, 2022

(86) PCT No.: PCT/EP2022/062932
§ 371 (c)(1),
(2) Date: Oct. 24, 2023

(87) PCT Pub. No.: WO2022/243161
PCT Pub. Date: Nov. 24, 2022

(65) Prior Publication Data

US 2024/0367914 A1 Nov. 7, 2024

(30) Foreign Application Priority Data

May 20, 2021 (DE) ..................... 10 2021 113 060.3

(51) Int. Cl.
*B65G 47/08* (2006.01)
*B65G 47/244* (2006.01)

(52) U.S. Cl.
CPC ......... *B65G 47/086* (2013.01); *B65G 47/244* (2013.01)

(58) Field of Classification Search
CPC ............................ B65G 47/086; B65G 47/244
See application file for complete search history.

(56) References Cited

U.S. PATENT DOCUMENTS 6,779,647 B1 * 8/2004 Nagler ................. B65G 47/084 198/395
8,147,177 B2 * 4/2012 Huber .................. B65G 47/086 414/791.4

(Continued)

FOREIGN PATENT DOCUMENTS

DE 10219129 A1 11/2003
DE 102009046133 A1 5/2011

(Continued)

OTHER PUBLICATIONS

English Translation of WO2016062390.*

*Primary Examiner* — Patrick H Mackey
(74) *Attorney, Agent, or Firm* — Laurence A. Greenberg; Werner H. Stemer; Ralph E. Locher

(57) ABSTRACT

A device for handling and/or grouping piece goods having a handling table extending along a main axis with a manipulation zone and a collection zone disposed one behind the other along the main axis in a transport direction. A first manipulator manipulates the piece goods and is designed to be movable at least partly in the direction of the main axis with variable positions. The first manipulator is moved between at least one normal position and at least one required position differing from the normal position. The first manipulator has a base working region paired with the normal position for manipulating the piece goods in the manipulation zone and a required working region paired with the required position for manipulating the piece goods outside of the base working region. An optical detection device monitors the manipulation of the piece goods in the manipulation zone and/or collection zone.

17 Claims, 4 Drawing Sheets

(56) References Cited

U.S. PATENT DOCUMENTS

| | | | | | |
|---|---|---|---|---|---|
| 11,220,000 | B2 * | 1/2022 | Kollmuss | ............... | B25J 9/1687 |
| 11,244,441 | B1 * | 2/2022 | Jeanes | .................... | G06Q 10/08 |
| 11,939,172 | B2 * | 3/2024 | Stollhof | ................. | B65G 47/31 |
| 2018/0162656 | A1 * | 6/2018 | Kanehara | ............... | B65G 57/24 |
| 2019/0308823 | A1 * | 10/2019 | Beer | ...................... | B65G 65/02 |
| 2021/0308722 | A1 * | 10/2021 | Hillerich, Jr. | .......... | G06V 20/64 |
| 2024/0092587 | A1 * | 3/2024 | Ferreira | ............... | B65G 47/084 |
| 2024/0092588 | A1 * | 3/2024 | Scaglione | ............ | B65G 47/086 |
| 2024/0174452 | A1 * | 5/2024 | Uriarte | ................... | B65G 37/02 |

FOREIGN PATENT DOCUMENTS

| | | | | | |
|---|---|---|---|---|---|
| DE | 102011104900 | A1 | 12/2012 | | |
| DE | 102012219886 | A1 | 5/2014 | | |
| DE | 102013202872 | A1 | 8/2014 | | |
| DE | 102013204095 | A1 | 9/2014 | | |
| DE | 102014017968 | A1 | 4/2016 | | |
| DE | 102017212157 | A1 | 1/2019 | | |
| DE | 102019120289 | A1 | 2/2021 | | |
| EP | 2208695 | A1 | 7/2010 | | |
| WO | WO-2016062390 | A1 * | 4/2016 | .............. | B25J 9/023 |
| WO | 2017182165 | A1 | 10/2017 | | |

* cited by examiner

DEVICE AND METHOD FOR HANDLING AND/OR GROUPING PIECE GOODS

FIELD AND BACKGROUND OF THE INVENTION

The invention relates to a device for handling and/or grouping piece goods, in particular for handling and/or grouping the piece goods for forming layers when palletising, and a corresponding method for handling and/or grouping piece goods.

The principle is known of assembling and packing piece goods or articles, such as bundles or packaging units, into superordinated larger units, in order to store them, transport them, and bring them into commercial circulation. In this situation, piece goods can be packing means or packaging units, such as, for example, bottles filled with a product (filling product), containers in the form of cartons, or also cans etc., which are packed, for example, in surrounding packaging, such as in cartons, trays, shrink film, etc., as bundles.

The principle is also known of forming and assembling pallets, which is usually designated as palletising. During palletising, first the articles or piece goods are, for example, grouped and/or assembled into preliminary groupings or groupings, or preliminary groups or groups respectively, in order then, by further assembling or arranging together of the groupings or preliminary groupings, to form individual layers of piece goods. Finally, a number of such layers are arranged above one another, thereby producing a layer stack, wherein such layer stacks are laid or formed, for example, on a transport pallet, and these completed laden pallets (if appropriate after wrapping by means of a film wrap) then finally form the transport, storage, and delivery unit.

The layer formation and, if appropriate, also the stacking of the layers takes lace, for example, on production lines of beverage filling systems. In this situation, it is possible, for example, essentially as one of the concluding production steps on such production lines, for layers of filled containers or bundles formed from them to be stacked above one another.

The principle is further known of using robots or manipulators or robot systems or manipulator systems in the corresponding production lines and/or packaging lines described heretofore, for the handling and grouping for the purpose of layer formation. This is frequently referred to as robot grouping. As a rule, in this situation the piece goods are guided by means delivery transport units, such as transport belts, which can also be referred to as delivery belts or distribution belts, to a working region or collecting region of the robots or manipulators referred to, in which the piece goods are then moved by means of the robots or manipulators to a respective predetermined or desired target position, and are assembled and ordered or grouped to form correct layers as required.

The robots or manipulators used in such production lines and/or packaging lines comprise, as a rule, at least one manipulator arm, such as a jointed arm, provided at the free end of which is at least one receiving device or gripping device for receiving or gripping the piece goods. By means of the manipulator arm, during the piece goods manipulation, the piece goods can, for example, be pushed on a handling table in a plane which corresponds to the transport plane, in the direction of the x-axis and y-axis of this transport plane. Likewise, the manipulator arm can frequently also relocate the piece goods, specifically by raising them in the direction of a z-axis forming a vertical height axis and by setting them down again at the target position.

A problem with the handling of piece goods with robot grouping is that there are frequently erroneous positionings of piece goods, such that one or several piece goods items is/are not correctly positioned. Such erroneous position can occur, for example, in the form of an angle deviation, wherein the item of piece goods is rotated, or in the form of a position deviation, in which the item of piece goods is not correctly placed in the direction of the x-axis and/or y-axis of the transport plane. Such erroneous positionings are frequently only identified very late in the entire process of the layer formation and palletising, namely in the later function chain, for example when the attempt is made to palletise a prepared layer of piece goods. The erroneous positioning or deviation must then be identified by an operator and rectified by manual intervention.

There is accordingly a requirement for improving the handling and/or grouping of piece goods by means of manipulators, in particular with regard to error identification and rectification.

SUMMARY OF THE INVENTION

The object of the invention is to provide a device for handling and/or grouping piece goods which overcomes the disadvantages of the systems known from the prior art, and in particular improves fault identification and fault rectification.

This object is solved by a device for handling and/or grouping of piece goods in accordance with the features of the claims. Moreover, to solve the object, a method for handling and/or grouping of piece goods is provided in accordance with the features of the claims. In this situation, the dependent claims relate to particularly advantageous further embodiments of the invention.

According to one important aspect, the invention provides a device for handling and/or grouping of piece goods, wherein the device comprises at least one handling table extending along a main axis, with at least one manipulation zone and at least one collection zone. In this situation, the manipulation zone and the collection zone are arranged behind one another along the main axis, wherein the collection zone is arranged in a transport direction of the piece goods, running in the direction of the main axis, after or behind the manipulation zone. The device further comprises at least one first manipulator for the piece goods manipulation. The device is characterised according to the invention in that the first manipulator is configured so as to be movable and change location at least in sections in the direction of the main axis, and in this situation can be moved between at least one normal position and at least one required position, which is different from the normal position. In this situation the first manipulator exhibits a base working region, assigned to its normal position, for the piece goods manipulation in the manipulation zone, as well as a further requirement working region assigned to a required position, for the piece goods manipulation outside its base working region. In addition, the device comprises at least one optical detection device for monitoring the piece goods manipulation in the manipulation zone and/or the collection zone.

The first manipulator can be moved over a predetermined section, in particular a stretch section, in a direction along the main axis, namely, for example, by means of a linear translational movement or translation. In this case, therefore, the first manipulator can also be understood to be a movable or location-independent or mobile manipulator, which can adopt different positions or locational positions along the predetermined section, in particular a stretch section, in the direction along the main axis.

The movement of the manipulator, in particular its displacement or translation, can be understood in this situation essentially as a forwards and backwards movement, parallel or approximately parallel to the main axis, between the at least one normal position and the at least one required position, in particular as a movement away from the normal position towards the required position and a corresponding return movement back to the normal position. The translational movement of the manipulator can therefore take place essentially in the transport direction of the piece goods, as well as against the transport direction of the piece goods. For the movement of the manipulator, provision is of course made for a suitable drive or corresponding drive means, conventionally known to the person skilled in the art.

The normal position of the first manipulator corresponds in particular to a locational position in which the manipulator operates within its base working region, and carries out the piece goods manipulation. The base working region therefore lies in or inside the manipulation zone of the handling table.

The normal position can be, for example, a first extreme position, namely a position from which the manipulator can only be moved in one direction, namely by a movement in the transport direction of the piece goods. As an alternative, however, the normal position can also be a middle position, such that the manipulator can be moved, starting from the normal position, in the transport direction of the piece goods as well as in a direction opposite to this.

The required position represents a position which differs from the normal position. In the at least one required position the manipulator works within its required working region and here carries out the piece goods manipulation outside the said base working region. For example, different required positions can be defined, in particular a plurality of required positions, in particular with required working regions assigned to them.

By means of the optical detection device for monitoring the piece goods manipulation in the manipulation zone and/or collection zone, and particularly advantageously, the piece goods manipulation can be followed optically. In this situation, simultaneously or in synchrony with the manipulation carried out by the manipulator of the individual piece goods or piece goods groups, optical data of the piece goods manipulation can be recorded or acquired, such as image data for example. In this situation the optical detection device is in particular configured and/or takes effect together with other components provided in the device, such as, for example, a corresponding control unit or instrumentation and control unit, in such a way that the data acquired is processed, compared, and evaluated, and, as a result, a deviation (reference/actual value deviation) can be identified.

Accordingly, it can be monitored and checked by optical supervision whether the piece goods item or the piece goods are present, before, during, and/or after the respective manipulation step, in the desired alignment and positioning, in particular that which is correct or exact as required. That is to say, a positioning error or an incorrect positioning can be identified, and in particular also a positioning error in relation to a piece goods item which has been brought into its target position or is in its target position. The identification of such a positioning error advantageously occurs together with the detection and allocation of a required working region for the manipulator. The terms "erroneous positioning" and "positioning error" in the meaning of the invention are used essentially as synonymous terms.

The optical detection device and the at least one first manipulator can be in a direct communicating connection with one another, or, for example, by means of a central instrumentation and control unit, communicating with the first manipulator as well as with the optical detection device. To the purpose, the first manipulator, the optical detection device, and the instrumentation and control unit, if provided, communicate with one another in such a way that the data detected by the optical detection device and/or the associated evaluation data, in particular the required working region detected and/or assigned, are available to the manipulator. As a dependency of this detected data and/or evaluation data, the manipulator can be automated, in particular automatically and independently, such as to adopt that required position, by movement along the main axis, which is assigned to the detected and determined required working region.

At this required position which is adopted in this way, the manipulator, which in turn is preferably automated, in particular fully automated or automatic and independent, can carry out the corrective manipulation steps for the correction of the erroneous positioning or to rectify the positioning error. Thanks to the possibility of backwards movement, an erroneously placed piece goods item can, if necessary, be moved out of an unfavourable position for the manipulator back into the manipulation zone, and corrected there.

In particular, with the present device according to the invention, it is therefore possible for an early automated error identification to be carried out, wherein the error identification can be particularly advantageously exercised before damage is incurred, which potentially would cause substantial effort and expenditure to rectify. Moreover, the present device according to the invention provides enormous advantages due to manual interventions by operating personnel to rectify an erroneous situation being reduced, or potentially even being avoided altogether. The error correction takes place automatically and independently by the device or machine itself, which preferably has the effect of higher machine availability on the production line or at the place of application.

A manipulator in the meaning of the present invention is a manipulator or robot which can be used on production lines in the technical field of piece goods manipulation, and which, for example, comprises an arm, in particular a manipulator arm or robot arm, provided at the free end of which is a device for manipulation, receiving, or detection or gripping, which is configured for detecting or gripping the piece goods. The piece goods received and detected by the detection and gripping device can be moved, with the aid of the manipulator arm or robot arm, at least in two and preferably all three spatial directions, namely in the direction of an x-axis, a y-axis, and a z-axis. The x-axis and y-axis, oriented perpendicular to one another, in this situation run essentially horizontal, and are accommodated in a horizontal plane which defines a transport plane of the handling table. The z-axis defines a vertical height axis.

In the meaning of the invention, the manipulator can preferably receive and take up individual or several piece goods items, and manipulate them for the purpose of grouping and layer formation. For example, the manipulator can also detect a defined group or pre-grouping of piece goods, and manipulate them for the purpose of the grouping and layer formation.

According to one preferred embodiment of the invention, the device further comprises at least one second manipulator for piece goods manipulation, wherein the second manipulator is likewise configured to be movable at least in sections in the direction of the main axis such as to change its location, and in this situation is movable between at least one normal position and at least one required position which is different from the normal position. The second manipulator advantageously comprises a base working region, assigned to its normal position, for the piece goods manipulator in the manipulator zone, and a required working region assigned to its required position, for the piece goods manipulator outside its base working region. As a result, both the piece goods manipulation itself as well as, in particular, the correction of erroneous positioning or the rectification of positioning errors can be carried out with a high degree of efficiency. For example, in this situation an optimisation and increase in efficiency can take place in such a way that the specific manipulator carries out the position change and the error correction and which, for example, must cover a shorter movement path to the necessary required position, or which, in the corresponding required working region, can more rapidly reach the erroneously positioned piece goods item or the erroneously positioned piece goods, or with lesser power and energy expenditure, or can carry out the corrective manipulation more easily and more accurately.

According to one preferred embodiment variant, the optical recognition device and the second manipulator are in direct or indirect communication connection with one another.

The required working region of the first manipulator and/or of the second manipulator preferably extends at least partially into the collection zone. This has the advantage that the respective manipulator can carry out a piece goods manipulation not only in the manipulation zone but also in the collection zone or in a part of the collection zone, which allows for greater flexibility in the piece goods manipulation and error correction.

Preferably the first and/or second manipulator(s) are configured such as to be movable in the direction of the main axis. For particular preference, the device comprises at least one rail system for the movable carrying of the first and/or second manipulator(s), wherein the first and//or second manipulator(s) is/are movable on rails of the rail system. For example, the rail system can be secured to a machine frame of the device, or configured as a separate rail system, and equipped with corresponding sockets and/or anchoring elements for erection.

According to one advantageous variant, the first and second manipulators are arranged opposite one another in relation to the main axis, and can be moved, in particular driven, along mutually opposing longitudinal sides of the handling table, extending in the direction of the main axis, between the respective normal and required positions. In this embodiment variant, the piece goods manipulation, as well as a required error correction, can be carried out from both longitudinal sides of the handling table, as a result of which a higher degree of efficiency can be achieved. For example, in this situation each manipulator can comprise a respective basic and required working region, which extend on the respective longitudinal side from the outside into approximately the middle of the handling table. It is also conceivable for the respective basic and required working regions of the manipulators to be assigned in another manner.

Particular advantages are also derived if the first and/or second manipulator(s) can also adopt intermediate positions between the respective normal position and a required position, forming an outer extreme position, by movement in the direction of the main axis. It is preferably possible in this situation for the manipulators to be moved into a large number of possible intermediate positions, namely, for example, moving steplessly into every possible intermediate position.

To further advantage, the device comprises at least one stationary manipulator for the piece goods manipulation, with an assigned working region in the manipulation zone. The additional stationary manipulator is preferably arranged upstream of the mobile manipulator(s), related to the transport direction of the piece goods. The stationary manipulator can be located, for example, in an inlet or delivery or allocation region, in particular at a face-side inlet or delivery or distribution end of the handling table.

In particular, the first and the second manipulators can be configured as identical in structural design with one another. Moreover, the stationary manipulator can be configured as identical in structural design with the first and/or second manipulator(s), except for the fact that this manipulator is not configured as movable in the direction of the main axis.

According to one preferred embodiment variant, the optical detection device and the stationary manipulator are in direct or indirect communicating connection with one another.

The optical detection device preferably comprises at least one camera for monitoring the piece goods manipulation, in particular an electronic camera. This is advantageously configured and arranged in such a way that an optical detection range of the camera covers at least a part region of the manipulation zone and/or of the collection zone. Thanks to the electronic camera, it is possible in particular for image data to be taken of the manipulation zone and/or the collection zone, for processing and evaluation purposes. Preferably, the optical detection range of the camera covers at least 30%, and in particular at least 50%, of the surface of the manipulation zone and/or the collection zone.

Particular advantages are derived from the fact that the at least one camera is arranged at a height level above the transport plane of the handling table, and is directed from above onto the manipulation zone and/or the collection zone. The taking of the image data takes place in this manner in a type of direct view from above or a oblique view from above onto the handling table, as a result of which a large scanning region can be utilised.

According to one preferred embodiment variant, the at least one camera is arranged in a transition section between the manipulation zone and the collection zone. Preferably, in this situation the at least one camera is arranged on a holding frame and is held by this, wherein the holding frame is, for example, connected to a machine structure or machine frame of the device, or can be secured to this.

Preferably, the optical detection device comprises several cameras, in particular of the same structural design, wherein at least one of the several cameras is in each case arranged at least in the region of the manipulation zone and at least in the region of the collection zone. For example, in this situation all the cameras can be held on a holding frame, wherein the possibility pertains that all the cameras are secured to a common holding frame, or that several holding frames are provided for several different cameras. All the cameras provided can be connected so as to communicate with the manipulator or manipulators, and preferably also connected so as to communicate with one another, such that, in particular, scanned data from all the cameras can be collected and made available in common.

Advantageously, the device comprises an instrumentation and control unit, wherein the instrumentation and control unit is in communicating connection with the optical detection device and with the first and/or second manipulator(s), and is configured to control and/or regulate the at least one first and/or second manipulator. In addition, the instrumentation and control unit can be configured to control and/or regulate the stationary manipulator referred to heretofore.

According to a preferred variant of the invention, the instrumentation and control unit is configured such as to receive and assess image data taken by the optical detection device, and to control and/or regulate the first manipulator and/or the second manipulator as a dependency of the assessed image data, and, in particular, in accordance with the requirement, to control and/or regulate a movement of the at least one first and/or second manipulator from its normal position to the corresponding required position.

For particular preference, for example, in this situation the image data taken by the optical detection device, in particular by the camera(s), is transferred to the instrumentation and control unit, where a comparison is then made of the captured data with predetermined reference data (target and actual comparison). The predetermined reference values can be stored, for example, in a memory device of the instrumentation and control device. Depending on this target and actual value comparison, in the event of a positioning error being identified by the instrumentation and control unit, a control and/or regulating signal is emitted, such that the first and/or second manipulator(s), by means of a movement in the direction of the main axis, travel out of the actual working region in the manipulation zone, namely out of the base working region and move to the required position which has likewise been emitted or issued by the instrumentation and control unit, in order there to correct the corresponding positioning error by suitable piece goods manipulation. The normally fixed base working region is therefore extended by the required working region, which in this situation can also be understood to be a correction region.

Preferably, the handling table is configured as multi-part. It preferably comprises at least one manipulation or grouping table, forming the manipulation zone, and at least one collection or layer forming table, forming the collection zone. For very particular preference, the handling table further comprises at least one displacement zone, wherein the displacement zone is arranged in the transport direction downstream of the collection zone, and wherein the displacement zone is preferably formed by a displacement table.

The handling table can comprise one or more transport devices for transporting the piece goods in the transport direction. In particular, the handling table can comprise an individual transport device in each case for the manipulation zone, the collection zone, and/or the displacement zone.

Further advantages are gained if a stop element is provided for stopping the piece goods, wherein the stop element is arranged at a rear end of the collection zone, in relation to the transport direction, and can be moved, in particular in a controlled manner, between a transport position which clears a transport path of the piece goods in the transport direction, and a holding position which blocks the transport path of the piece goods in the transport direction.

According to one preferred embodiment variant, the stop element is configured as essentially strip-shaped and movable in a vertical direction, wherein the stop element extends, in accordance with its length, in a transverse direction running essentially perpendicular to the main axis.

As indicated in the preamble, the present invention also relates to a method for handling and/or grouping of piece goods, wherein the piece goods are transported in a transport direction, over a handling table extending along a main axis, and running in the direction of the main axis, and in this situation are assembled to form an ordered group and/or layer of piece goods. The piece goods are in this situation first positioned, by means of at least one first manipulator, by piece goods manipulation in a manipulation zone of the handling table, and then assembled for grouping and/or layer formation in a collection zone arranged in the transport direction downstream of the manipulation zone. The method is characterised according to the invention in that the piece goods manipulation in the manipulation zone and/or collection zone is monitored by means of at least one optical detection device, and for this purpose actual data relating to the positioning of the piece goods is acquired by the optical detection device and assessed by data comparison with corresponding reference or target data. Depending on the actual and target data comparison, an erroneous positioning of piece goods will be identified and corrected, wherein, depending on the requirement for the correction, the first manipulator moves out of a normal position, to which a base working region of the first manipulator is assigned for piece goods manipulation in the manipulation zone, by way of a movement in the direction of the main axis into at least one required position, and there, in an assigned required operating region, corrects the erroneous positioning of piece goods by means of piece goods manipulation.

The advantages already referred to heretofore in connection with the device also relate as a whole to the method according to the invention, as a result of which reference is expressly made to the other foregoing descriptive passages relating to the method.

Preferably, the identification and correction of erroneous positioning takes place in an automated manner, as well as being controlled and/or regulated by means of an instrumentation and control unit.

Likewise, for preference the piece goods manipulation is carried out in the manipulation zone by means of the first manipulator, and at least one second manipulator which can be moved such as to change location in the direction of the main axis, wherein the first and second manipulators are preferably arranged opposite one another laterally at the handling table, in relation to the main axis. Depending on the relative spatial position of the detected erroneous positioning on the handling table, in order to carry out the correction of the erroneous positioning either the first or the second manipulator moves into the corresponding required position, by means of a movement effected in the direction of the main axis, and corrects the erroneous positioning.

For further preference, once the erroneous positioning of the piece goods has been corrected, the first and/or second manipulator(s) move back again, out of the corresponding required position into the normal position.

BRIEF DESCRIPTION OF THE FIGURES

The invention is explained in greater detail hereinafter, on the basis of the Figures and in relation to exemplary embodiments. The Figures show.

DETAILED DESCRIPTION OF THE INVENTION

The device designated in general in the Figures by 1, for handling and grouping piece goods 20, can represent, for example, a constituent part of a production line for producing beverages and a part of a packing and/or palletising apparatus, in which, for example, the piece goods 20 are ordered, grouped, or assembled, and, for the purpose of layer formation, are ordered into corresponding groups G or groupings, pre-groups, part layers or layers L. Several such formed layers L can then be stacked above one another, preferably on pallets, to form layer stacks, as a result of which finally a pallet is assembled as a transport and storage unit, which is packed with a stack of piece goods arranged in layers above one another.

The piece goods 20 provided for handling and/or grouping can be, for example, cartons, boxes, or trays loaded with containers. As an alternative, the piece goods 20 can be containers held together by shrink film, board/cardboard cutouts, plastic rings, and/or points of adhesive, but also individual containers, cans, or the like. It is also possible for groups or preliminary groupings of piece goods 20 to be provided for the handling.

The device 1 is provided with piece goods 20, provided for the handling and/or grouping, at its delivery end 2*a*, on the intake side, which can also be designated as the inlet end or distribution end, by means of an inlet transport device not represented in the Figures, for example by way of a single-lane or multi-lane delivery transport belt or distribution belt, wherein the piece goods 20 are conveyed in a transport direction F, and in this basic transport direction F also pass through the device 1 from the delivery end 2*a* as far as its outlet end 2*b*, on the discharge side.

In this situation, the piece goods 20 are transported as a rule in at least one row or in several essentially parallel rows, by the delivery transport device, and run in this way over the device 1 until at least its delivery end 2*a*, where the piece goods 20 are finally transferred to the device 1, which can also be understood as robot grouping.

Figure 1:
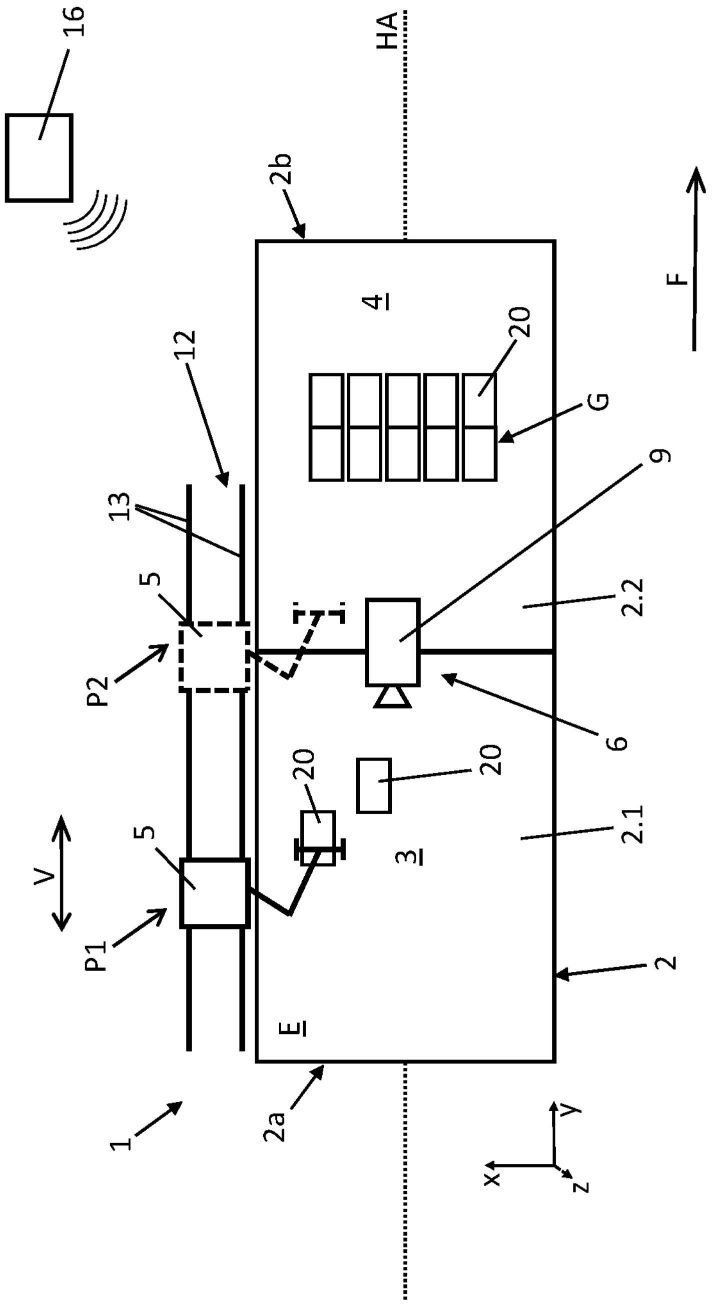
FIG. 1 In a very simplified and rough schematic representation, an embodiment of the present device in a view from above.

FIG. 1 shows, in a very simplified and rough schematic representation, an embodiment of the present device 1 in a view from above. The device 1 comprises a handling table 2 extending along a main axis HA. The transport direction F of the piece goods 20 runs in this situation in the direction of the main axis HA. The handling table 2 comprises on its upper side a handling surface, aligned essentially horizontally, on which the piece goods 20 lie for their handling and/or grouping, i.e. at least during specific manipulation steps in the handling and/or grouping.

The handling surface of the handling table 2 is preferably carried or held by a carrying frame or carrying structure standing on the substrate, not visible in the Figures, and is arranged in particular at a predetermined height level at a defined distance interval from the substrate. The handling surface forms a transport plane E, wherein the transport plane E extends in an x-direction and y-direction, and x and y axes run in this transport plane E or are taken up by the transport plane E. Like the co-ordinate system indicated only in a very rough form in FIG. 1, the y-axis runs in the longitudinal direction of the device 1, namely essentially parallel to its main axis HA, and the x-axis extends essentially transverse to the main axis HA of the device 1. The z-axis, which is additionally indicated in FIG. 1 only for the sake of completeness, corresponds to a vertical height axis, which from the observer's perspective moves out of the drawing plane of FIG. 1.

In the example represented, the handling table 2 comprises a manipulation zone 3 and a collection zone 4, wherein the manipulation zone 3 and the collection zone 4 are arranged following one another along the main axis HA, and the collection zone 4 follows the manipulation zone 3 in the transport direction F of the piece goods 20. The handling table 2 of the embodiment example according to FIG. 1 is configured as a multi-part handling table 2, and is composed of a manipulation or grouping table 2.1, defining the manipulation zone 3, as well as, following this, a collection or layer forming table 2.2, defining the collection zone. It is of course possible for the handling table 2 also to be formed by a single table with manipulation zone 3 and collection zone 4.

The device 1 further comprises a first manipulator 5 for piece goods manipulation, wherein the manipulator 5 manipulates the piece goods 20 mainly in the manipulation zone 3 by way of piece goods manipulation, in order to position the piece goods 20 correctly on the handling surface for grouping and for subsequent layer formation. For this purpose, the manipulator 5 takes up or grasps a piece goods item 20, or, as appropriate, also several piece goods items 20, assembled as a (pre)group, in order to move this piece goods item 20 or the piece goods 20 in the x and y-direction, and, as a result, to bring them into their respective predetermined target position, and, in turn, specifically in a predetermined correct positioning for the respective target position or orientation. The movement of the piece goods 20 into the target position takes place, for example, by a displacement of the piece goods 20 in the x and y-direction over the transport plane E, or also by a movement in which the piece goods 20 are raised by an additional and at least short raising and lowering in the z-direction and then set down again. In the collection zone 4, from the oriented and exactly positioned piece goods 20, a group G is finally formed, which after completion is assembled to form a layer L (see FIG. 2).

The first manipulator 5 in the present case is arranged laterally at the handling table 2, on a longitudinal side of the handling table 2 extending in the direction of the main axis HA, and is configured as a non-stationary mobile manipulator 5, which is configured such as to be movable for changing location by means of a translational movement, in particular a sliding movement in the direction along the main axis HA, and as a result can adopt different positions relative to the handling table 2. In particular, the manipulator 5 is movable or can be moved between at least one normal position P1 arranged in the region of the manipulation zone 3, which defines its fundamental or basic position, and at least one required position P2, arranged in the region of the collection zone 4 or close to the collection zone 4.

For this purpose, the first manipulator 5 is carried by a rail system 12, wherein the rail system 12 is equipped with rails 13, which extend in their length in the direction of the main axis HA and on which the manipulator 5 can be displaced or moved, such that the manipulator 5 can be moved backwards and forwards in the displacement direction V between the normal position P1 and the required position P2 by means of a to-and-fro movement. The rail system 12 can be located, for example, on the carrier frame or carrier mount of the handling table 2, or formed as a separate stand-alone rail system 12, which stands on its own socket or anchoring section on the substrate, or is anchored there.

In the example represented, the rails 13 of the rail system 12 likewise run along the longitudinal side of the handling table 2, but at an adequate lateral distance from the handling table 2 so as to allow for unimpeded movement or travel of the manipulator 5. It is also possible for the rails 13 to run at a height level above the transport plane E.

The first manipulator 5 comprises a base working region for piece goods manipulation assigned to its normal position P1, inside the manipulation zone 3, which is deemed to be its own assigned working region. This general base working region can, however, be extended or supplemented by its required working region, assigned to its required position P2, for piece goods manipulation outside its base working region, when, depending on the requirement, namely when needed, the manipulator 5 adopts the required position P2 by means of a travel movement.

The device 1 further comprises an optical scanning device 6 for monitoring the piece goods manipulation in the manipulation zone 3 and/or collection zone 4, which in the present example in FIG. 1 comprises an electronic camera 9, which is arranged in a transitional region between the manipulation zone 3 and the collection zone 4. At least the electronic camera 9 of the optical detection device 6 is arranged at a height level above the transport plane E of the handling table 2, such that the electronic camera 9 is directed from above onto the transport plane E, and an optical detection region of the electronic camera 9 corresponds at least to one part region of the manipulation zone 3, and preferably also to a part region of the collection zone 4.

The optical detection device 6, in particular its electronic camera 9, can detect image data from the transport plane E of the handling table 2 and the piece goods 20 located there, in their respective positioning, and record and assess or compare it.

The optical detection device 6, in particular its electronic camera 9, is in communicating connection with the manipulator 5, wherein, in the exemplary embodiment represented, an instrumentation and control unit 16 is preferably provided, which is in communicating connection both with the optical detection device 6 as well as with the manipulator 5. The instrumentation and control unit 16 is configured in particular to receive and assess image data captured by the optical detection device 6, to compare this data with predetermined reference data deposited in a memory unit, and then, as a dependency of the assessed image data, in particular of the target and actual value comparison, to control and/or regulate the manipulator 5.

Advantageously, the instrumentation and control unit 16 emits a signal, as a dependency of the target and actual value comparison, for controlling and/or regulating the manipulator 5, which is transmitted to the manipulator 5. The controlling and/or regulating signal which is emitted therefore initiates, in accordance with the requirement, a movement of the manipulator 5 from its normal position P1 to the required position P2, and a corresponding piece goods manipulation in the required operating region.

With the optical detection device 6, the device 1 is configured and arranged such as to identify positioning errors of piece goods 20. In the event of such an error recognition by the optical detection device 6, the movable manipulator 5 can then move in a controlled/regulated manner, automated and independently, out of its actual base working region in the manipulation zone 3 and in the direction of the collection zone 4, in order to adopt the required position P2 in accordance with the requirement, and there correct the erroneous positioning in the required working region. Should an erroneously positioned piece goods item happen to be in an unfavourable position, such that it is not easily accessible at that location for a corrective piece goods manipulation by the manipulator 5, then the manipulator 5 can then bring the piece goods 20 back into the manipulation zone 3 again, and carry out a correct positioning or correction in the base working region.

The erroneous positioning of a piece goods item 20 can relate in this case to an erroneous position in the x-y direction, or an erroneous angle alignment or angle orientation of the piece goods item 20, i.e. for example that the piece goods item 20 is rotated in reference to the main axis HA, in comparison with the reference orientation.

Figure 2:
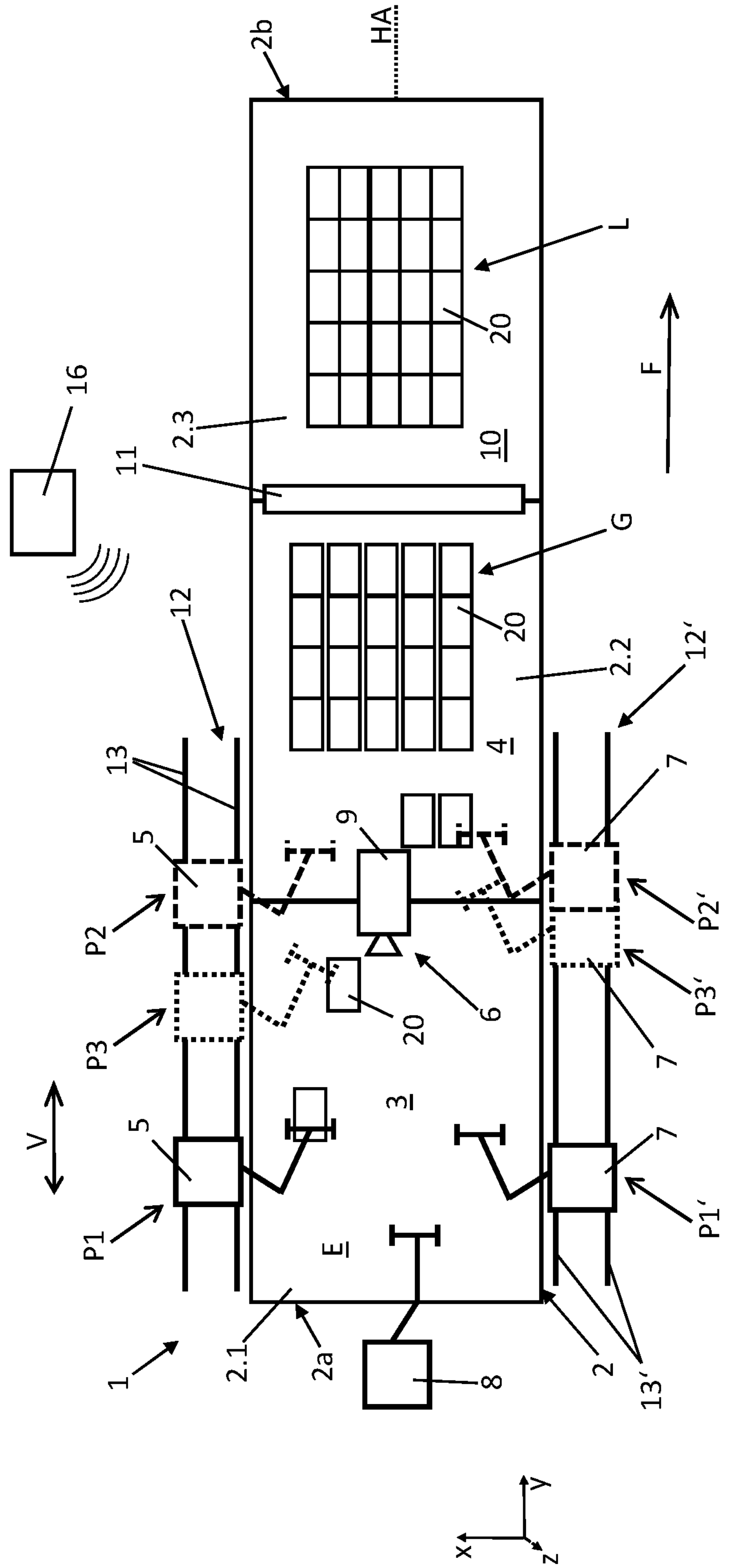
FIG. 2 in a very simplified and rough schematic representation, an alternative embodiment of the present device in a view from above.

FIG. 2 shows an alternative embodiment of the device 1, and specifically in a very simplified and rough schematic representation as a view from above. With the device 1 according to FIG. 2, the handling table 2 additionally comprises a displacement zone 10, on the discharge side at the outlet end 2*b* and following the collection zone 4 in the transport direction F, which in the example represented is formed by a displacement table 2.3 (with the embodiment according to FIG. 1, such a displacement zone 10 is not represented, but may still be present).

In the displacement zone 20, for example, a finished layer L of piece goods 20 is located, which can then be transferred out of the displacement zone 10 onto a pallet or onto a layer stack which is already formed on a pallet.

With the embodiment represented, in addition, at a rear end of the collection zone 4, in relation to the transport direction F of the piece goods 20, a stop element 11 is provided for stopping the piece goods 20, which in particular can be changed in a controlled manner between a transport setting which clears a transport path of the piece goods 20 in the transport direction F, and a holding position which blocks the transport path of the piece goods 20 in the transport direction F. By means of the stop element 11, the group G of piece goods 20 forming in the collection zone 4 can be securely held back in the collection zone 4 until the group G is complete.

The stop element 11, which in the example from FIG. 2 is essentially strip-shaped, and which can also be designated as a stopping element, extends with its length transverse to the main axis HA. In the vertical direction, namely in the z-direction, the stop element 11 is configured as movable by being raised. In principle, it is possible in this situation for the stop element 11 to be arranged above the transport plane E, and specifically in its transport setting at a distance interval which corresponds at least to a height of the piece goods 20. The stop element 11 can preferably be lowered into its holding setting by a lowering movement in the direction towards the transport plane E. The stop element 11 can also be arranged in its transport setting beneath the transport plane E, and raised from below by a lifting movement into its holding setting, until it projects upwards over the transport plane E. Other stop elements 11 are of course also conceivable, which can be moved, for example, by pivoting or horizontal displacement between its respective transport setting and holding setting.

With the device 1 according to FIG. 2, in differentiation to the embodiment from FIG. 1, provision is additionally made for a second mobile manipulator 7, which can likewise be moved on rails 13' of a rail system 12' over a longitudinal section of the handling table 2 in the direction of the main axis HA, and can likewise be moved between a normal position P1' and a required position P2'. The requirement dependent movement of the second manipulator 7, as well as the corrective piece goods manipulation in the required working region of the second manipulator 7, takes place in the same manner as for the first manipulator, as already described in connection with FIG. 1.

As can further be seen from FIG. 2, the manipulators 5, 7 can also adopt intermediate positions P3, P3' between the respective normal position P1, P1' and the required position P2, P2'. Preferably it is possible in this situation for the manipulators 5, 7 to move into a large number of possible intermediate positions P3, P3', namely, for example, steplessly into every possible intermediate position P3, P3', and, in a respective intermediate working region arranged there, can carry out a corrective piece goods manipulation as required. It is self-explanatory that the adoption of intermediate positions P3 is also possible with the embodiment variant according to FIG. 1.

With the embodiment variant represented in FIG. 2, a stationary manipulator 8 is also provided, which is stationed on the delivery side in the region of the delivery end 2*a* of the handling table 2, in particular arranged on the face side at the handling table 2. The stationary manipulator 8 comprises a working region, which corresponds to a delivery side region of the manipulation zone 3.

Figure 3:
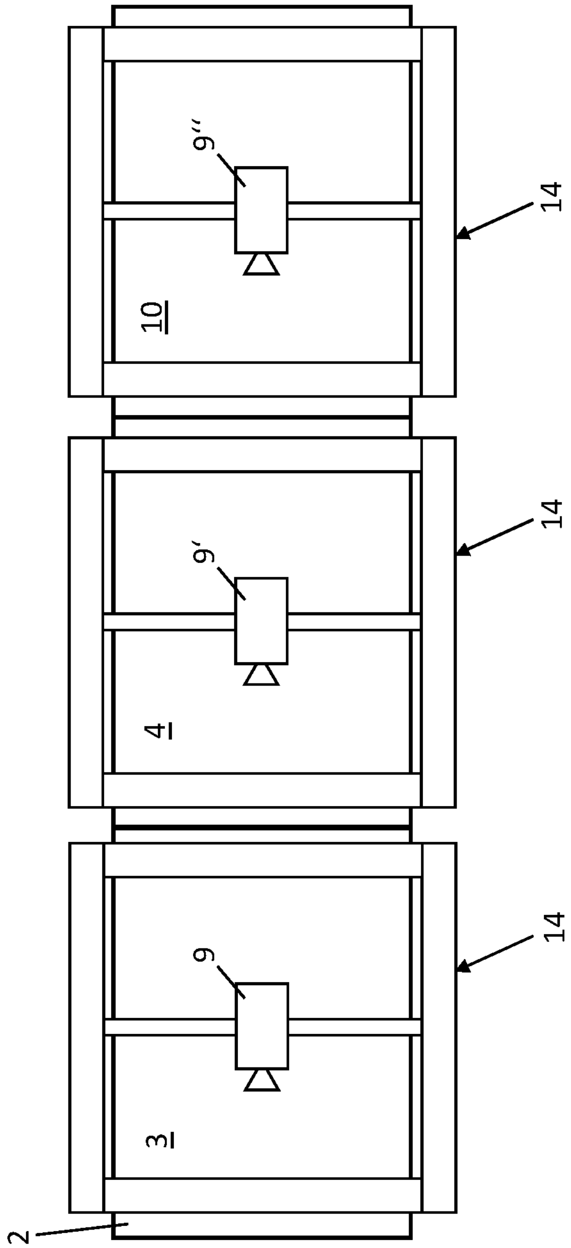
FIG. 3 an embodiment variant of the handling table and of the optical detection device, in a very simplified view from above, and omitting various other device components.

Represented in FIG. 3 is a variant of the optical detection device 6 with several electronic cameras 9, 9, 9", and their preferred arrangement relative to the handling table 2, and specifically on the basis of a very simplified view from above, omitting other components of the device. In the example from FIG. 3, an individual electronic camera 9, 9', 9" is provided each for the manipulation zone 3, the collection zone 4, and the displacement zone 10, wherein the electronic cameras 9, 9', 9" are in each case arranged at a height level above the transport plane E, and are directed from above onto the handling table 2. Each of the electronic cameras 9, 9', 9" are in this situation arranged centrally or essentially centrally above the respective zone (manipulation zone 3, collection zone 4, displacement zone 10).

The electronic cameras 9, 9', 9" are in this situation held by means of respective holding frames 14. Preferably, the electronic cameras 9, 9', 9" are in this situation secured to respective holding frames 14 such as to be capable of adjustment, alignment, and/or pivoting, in order to be able to adjust the camera setting relative to the handling table 2 and, related to the application, towards the transport plane E.

It is understood that embodiment variants with only two cameras 9, 9', 9" are also possible. In principle, the arrangement of the cameras 9, 9', 9" relative to the handling table 2 is freely selectable, provided that it is ensured that the optical detection region of the cameras 9, 9', 9" allows for the monitoring of the piece goods manipulation at least in part sections of the manipulation zone 3 and/or the collection zone 4.

The working or operating manner of the present device 1, in particular the automated error identification and error rectification, are described in greater detail and further clarified hereinafter by reference to FIG. 4 (sections A to C of the Figure).

Figure 4:
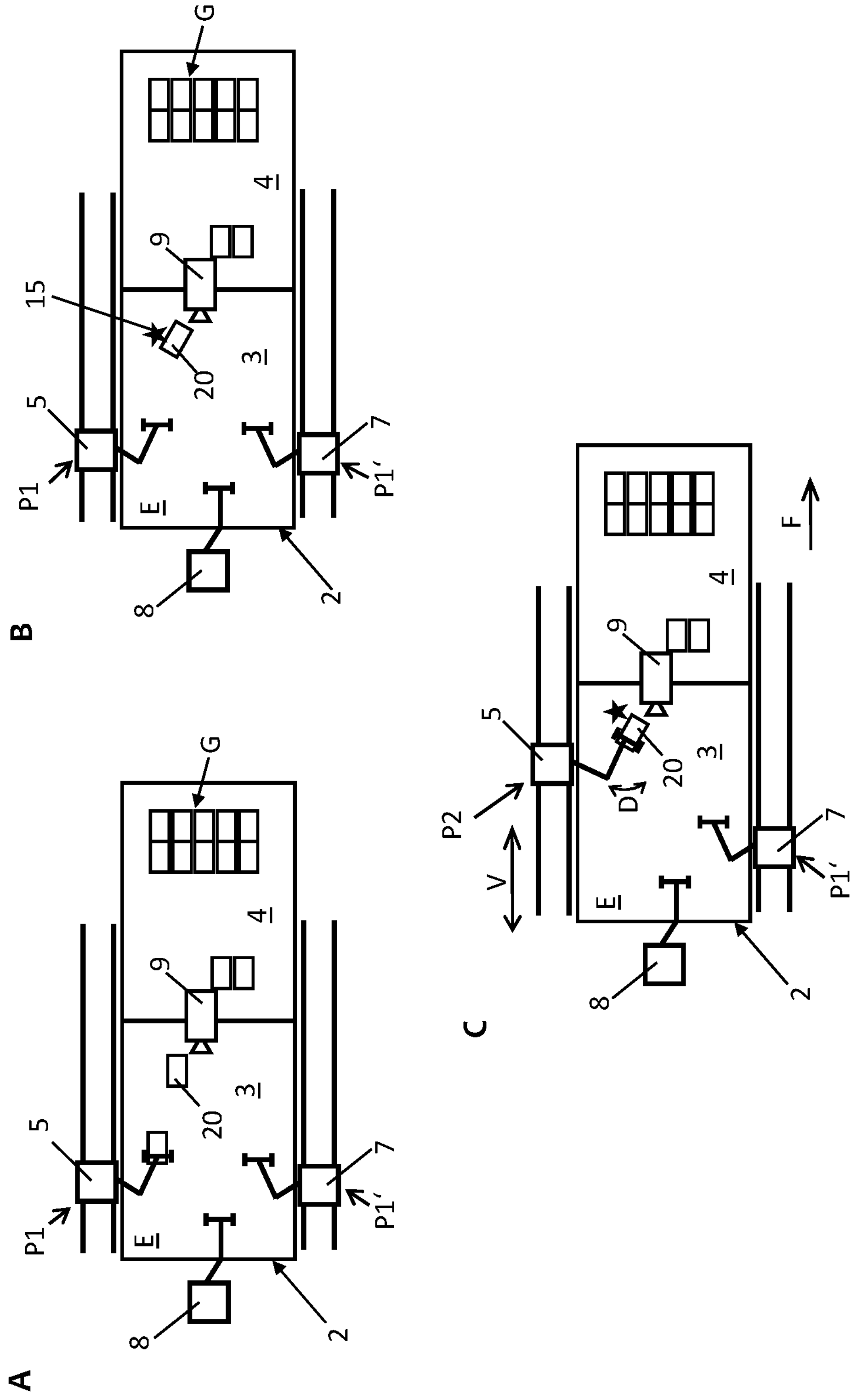
FIG. 4 in the sections A to C, in each case in a very simplified view from above onto the handling table, a respective operational state of the present device in the act of error identification and error rectification.

Section A of FIG. 4 shows the piece goods in the manipulation zone 3, and specifically in an operational state or processing state, in which there are no errors present, and all the piece goods 20 are positioned correctly, namely in both the manipulation zone 3 as well as in the collection zone 4, i.e. in their respective correct positioning and alignment, in particular also in the respective correct positioning before and after a manipulation step, and therefore also in correct positioning at the specified target position. For reasons of easier overview, only individual piece goods items 20 are represented, and only the manipulator 5 is shown in the manipulation state, i.e. in engagement with a piece goods item 20. It is understood, however, that the manipulators 7, 8 can operate simultaneously.

The piece goods manipulation is monitored by the optical detection device 6, in particular by its cameras 9, as a result of which it is recognised, in the state shown in section A, that there are no errors present.

The situation is different in section B of FIG. 4, since here a piece goods item 20 is positioned erroneously, and specifically the piece goods item 20, which in section B of FIG. 4 is marked by a star and designated by the reference number 15. Here, the erroneously positioned piece goods item 20 is not oriented straight, in accordance with the reference alignment, with its length in the direction of the main axis HA, but is located obliquely, such that the piece goods item 20 is arranged rotated longitudinally in relation to the main axis HA, or stands at an acute angle to the main axis HA. This positioning error is identified by the monitoring of the piece goods manipulation carried out by means of the electronic camera 3.

The positioning error identified (marked by the star) is communicated to a mobile manipulator 5, 7, which can be moved such as to change location, preferably by 24 means of the instrumentation and control unit, not represented in FIG. 4. In the example from FIG. 4, the positioning error is notified to the first manipulator 5, since the present normal position P1 of this manipulator 5 lies at only a short spatial distance from the positioning error, and the positioning error is better accessible for the manipulator 5.

Notified by this data and signal transfer, the movable manipulator 5 can now independently carry out a correction of the positioning error, and for this purpose is first caused to be moved in a controlled manner out of its normal position P1 into the required position P2, and specifically by a travel movement towards the collection zone 4, namely in the displacement direction V corresponding to the transport direction F.

At the required position P2, the manipulator 5 can then carry out the manipulation steps which correspond to its required working region at that location, in order to rectify the positioning error. In the case shown in section C of FIG. 4, the manipulator 5 grips the erroneously positioned piece goods item 20 and, by angle correction, in particular by a rotational movement D, brings it into the correct alignment or positioning.

The error identification and error rectification can in this situation be carried out in a fully automated manner, without manual intervention, and specifically very early within the handling and grouping process, in particular essentially already simultaneously with the piece goods manipulation during the handling and grouping process.

REFERENCE NUMBER LIST

1 Device
2 Handling table
2*a* Delivery end
2*b* Outlet end
2.1 Manipulation or grouping table
2.2 Collection or layer forming table
2.3 Displacement table
3 Manipulation zone
4 Collection zone

5 First mobile manipulator
6 Optical detection device
7 Second, mobile manipulator
8 Fixed-location manipulator
9, 9', 9" Electronic camera
10 Displacement zone
11 Stop element
12, 12' Rail system
13, 13' Rails
14 Holding frame
15 Marking of a positioning error
16 Instrumentation and control unit
D Rotational movement
E Transport plane
F Transport direction
G Grouping or pre-grouping
HA Main axis
L Layer
P1, P1' Normal position
P2, P2' Required position
P3, P3' Intermediate position
V Displacement direction

The invention claimed is:

1. A device for the processing of piece goods, comprising:

at least one handling table extending along a main axis, said at least one handling table having a manipulation zone and a collection zone;

said manipulation zone and said collection zone being disposed one behind another along the main axis, and said collection zone being disposed downstream of said manipulation zone in a transport direction of the piece goods running in a direction of the main axis;

at least one first manipulator for piece goods manipulation, said first manipulator being configured to be movable and change location at least in sections in the direction of the main axis and move between at least one normal position and at least one required position which differs from said normal position;

said first manipulator having a base working region for piece goods manipulation in said manipulation zone, allocated to the normal position of said first manipulator, and said first manipulator having, outside a base working region, a required working region for piece goods manipulation allocated to the required position of said first manipulator, at least one optical detection device configured for monitoring the piece goods manipulation in said manipulation zone and/or said collection zone; and an instrumentation and control unit, said instrumentation and control unit being communicatively connected to said optical detection device and with said first manipulator, and said instrumentation and control unit being configured for controlling and/or regulating said first manipulator; and said instrumentation and control unit being configured to receive and assess detected image data from said optical detection device, and to control and/or regulate said first manipulator based on assessed image data.

2. The device according to claim 1, further comprising:

at least one second manipulator for piece goods manipulation;

said second manipulator being configured to be movable and change location at least in sections in the direction of the main axis and move between at least one normal position of said second manipulator and at least one required position of said second manipulator which differs from said normal position of said second manipulator; and said second manipulator having a base working region for piece goods manipulation in said manipulation zone, allocated to the normal position of said second manipulator, and a required working region for piece goods manipulation allocated to a required position of said second manipulator, outside a base working region.

3. The device according to claim 2, wherein said required working region of said first manipulator and/or of said second manipulator extends at least partially into said collection zone.

4. The device according to claim 2, further comprising at least one rail system configured for a movable carrying of said first manipulator and/or second manipulator, and said first manipulator and/or second manipulator being configured to move on rails of said rail system.

5. The device according to claim 2, wherein said first manipulator and/or second manipulator are disposed opposite one another in relation to the main axis and can be moved along longitudinal sides of said handling table, extending opposite one another in the direction of the main axis, between respective normal and required positions.

6. The device according to claim 1, further comprising at least one stationary manipulator for piece goods manipulation having an assigned working region in said manipulation zone.

7. The device according to claim 1, wherein said optical detection device has at least one camera configured for monitoring the piece goods manipulation, and an optical detection range of said camera has at least one part region of said manipulation zone and/or of said collection zone.

8. The device according to claim 7, wherein said at least one camera is disposed at a height level above a transport plane of said handling table, and said at least one camera is directed onto said manipulation zone and/or said collection zone from above.

9. The device according to claim 7, wherein said at least one camera is disposed in a transition section between said manipulation zone and said collection zone.

10. The device according to claim 7, wherein said at least one camera is a plurality cameras, and at least one of said plurality cameras is disposed at least in a region of said manipulation zone and at least one of said plurality cameras is disposed at least in a region of said collection zone.

11. The device according to claim 1, where in said handling table is configured as multi-part handling table having at least one manipulation or grouping table defining said manipulation zone and at least one collection or layer forming table defining said collection zone.

12. The device according to claim 1, wherein said handling table has at least one displacement zone, and said displacement zone is disposed downstream of said collection zone in the transport direction.

13. The device according to claim 1, further comprising a stop element configured for stopping the piece goods, wherein said stop element is disposed at a rear end of said collection zone relative to the transport direction of the piece goods.

14. A method for processing piece goods, the method comprising:

transporting the piece goods in a transport direction running in a direction of a main axis, over a handling table extending along the main axis, and assembling an ordered group and/or layer of piece goods by positioning the piece goods, via at least one manipulator, by piece goods manipulation in a manipulation zone of the handling table; and assembling for grouping and/or layer forming in a collection zone in the transport direction downstream of the manipulation zone, monitoring the piece goods manipulation in the manipulation zone and/or collection zone by at least one optical detection device;

detecting an actual data relating to a positioning of the piece goods by the optical detection device and assessing by data comparison of the actual data with reference data; and detecting an erroneous positioning of piece goods based on the data comparison of actual data with the reference data, and correcting the erroneous positioning by moving the first manipulator out of a normal position, to which a base working region for piece goods manipulation in the manipulation zone is assigned, by a movement in the direction of the main axis and into a required position, and correcting the erroneous positioning of the piece goods in an assigned required working region via piece goods manipulation communicating between an instrumentation and control unit and the optical detection device and the first manipulator, and controlling and/or regulating the first manipulator via the instrumentation and control unit; and receiving and assessing, via the instrumentation and control unit, the detected actual data from the optical detection device, and controlling and/or regulating the first manipulator based on assessed image data.

15. The method according to claim 14, wherein the detecting and correcting of the erroneous positioning takes place in an automated manner, as well as being controlled and/or regulated by an instrumentation and control unit.

16. The method according to claim 14, wherein:

the piece goods manipulation is carried out in the manipulation zone by the first manipulator and by at least one second manipulator which can be moved to change location in the direction of the main axis; and based on the relative spatial position of the detected erroneous positioning on the handling table, in order to correct the erroneous positioning, the first or the second manipulator are moved into the corresponding required position by a movement made in the direction of the main axis, and correct the erroneous positioning.

17. The method according to claim 16, wherein after correcting the erroneous positioning of piece goods, the first manipulator and/or second manipulator are moved out of the corresponding required position and back into the normal position.

* * * * *